United States Patent [19]

Shaffer et al.

[11] Patent Number: 4,467,823

[45] Date of Patent: Aug. 28, 1984

[54] HIGH PRESSURE BALL VALVE

[75] Inventors: Charles D. Shaffer; Ivan Miller, both of Fullerton, Calif.

[73] Assignee: Shafco Industries Inc., Anaheim, Calif.

[21] Appl. No.: 318,208

[22] Filed: Nov. 4, 1981

[51] Int. Cl.³ .............................................. F16K 5/20
[52] U.S. Cl. .................................... 137/15; 137/315; 251/315
[58] Field of Search ............... 251/315, 172, 192, 160, 251/292, 316, 317; 137/15, 315

[56] References Cited

U.S. PATENT DOCUMENTS

| | | | |
|---|---|---|---|
| 3,047,007 | 7/1962 | Lunken | 137/315 |
| 3,522,930 | 8/1970 | Richards | 251/315 |
| 3,566,909 | 3/1971 | Scaramucci | 137/315 |
| 4,175,726 | 11/1979 | Richards | 251/315 |

Primary Examiner—Martin P. Schwadron
Assistant Examiner—James R. Shay
Attorney, Agent, or Firm—Knobbe, Martens

[57] ABSTRACT

A ball valve comprises a cylindrical casing having an axial bore therethrough for passage of fluids. The ball is mounted between annular upper and lower seats, the latter being compressible and supported by an annular shoulder within the casing. The ball has diametrically opposed slots that receive a pin and a wrench plug, respectively, which are rotatably mounted within diametrically opposed longitudinal apertures in the casing. The ball has a large central bore therethrough whose axis is perpendicular to the ball's rotational axis, so that the fluid path may be opened and closed by rotating the ball. Prior to loading the valve, the ball is in its closed position in which the slots are parallel to the axis of the casing, thereby permitting the ball to float axially between the seats. In order to load the valve under compression, the wrench plug is manually rotated with a wrench until the ball is turned to its open position. This rotation cams the ball downward against the lower seat, compressing the seat. With the lower seat under compression, the upper seat is locked in place. A cone is positioned above the upper seat to direct the fluid flow through the valve. The head of the wrench, which mates with the plug, is machined so that the wrench handle extends at a forty-five degree angle from the axis of the casing when the ball is fully opened or closed. This permits the wrench to be rotated through a ninety-degree angle with maximum leverage for the operator when opening or closing the valve so that detachment and reinsertion of the wrench is not required.

15 Claims, 6 Drawing Figures

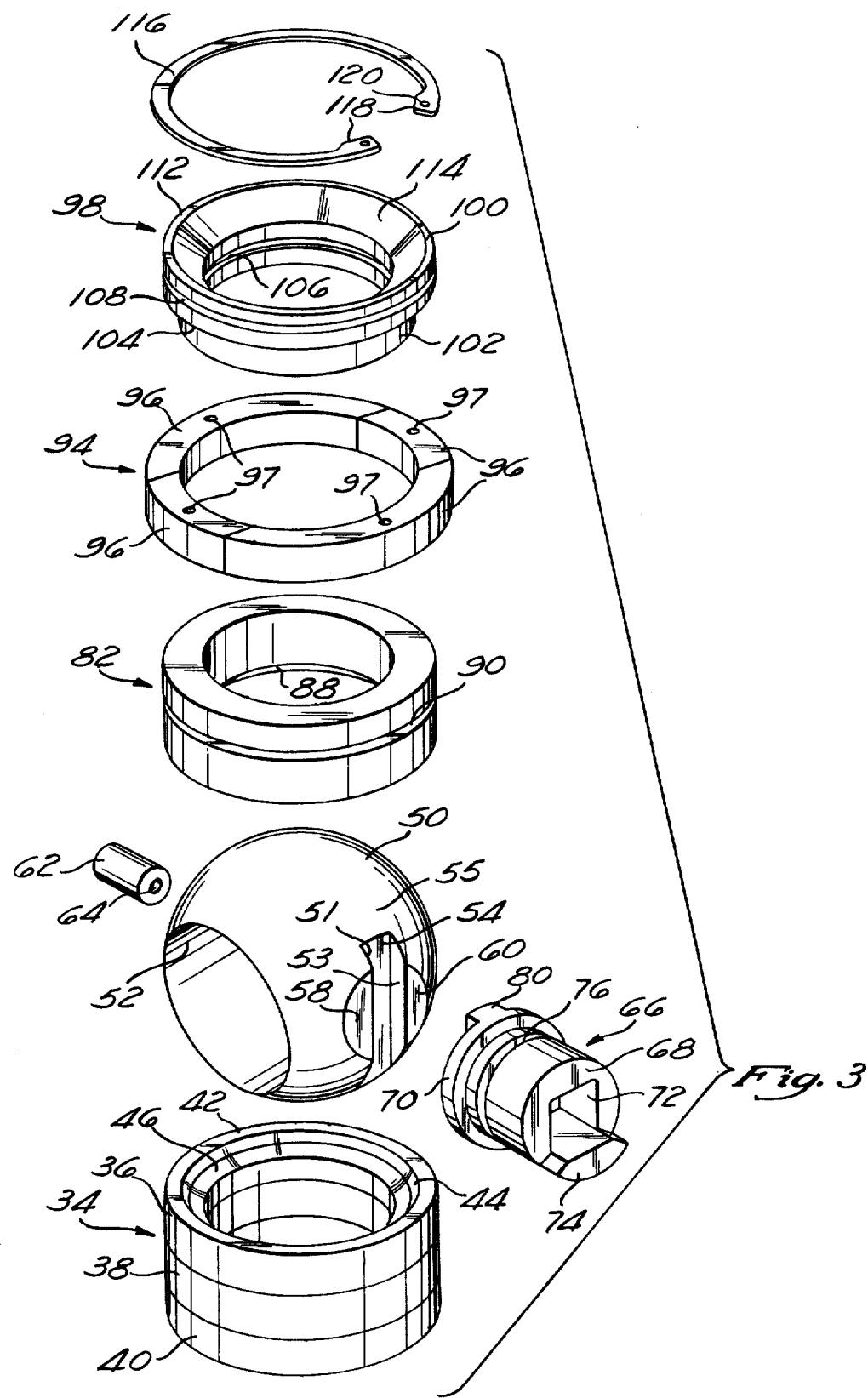

HIGH PRESSURE BALL VALVE

BACKGROUND OF THE INVENTION

The invention relates to a high pressure ball valve, and more particularly to Kelly cocks used in oil well drilling.

In a rotary drilling rig, an engine turns a round flat table having a square aperture therethrough. The table rotates a square piece of pipe, the Kelly, that extends through the aperture and threadably engages the remainder of the drill string. A Kelly cock is a valve mechanism housed within a cylindrical pipe that is threadably engaged to the drill string above or below the Kelly. The Kelly cock permits the opening and closing of the drill string to the drilling fluid, "mud", which is pumped under high pressure from above the Kelly down the drill string, to the drill bit. The Kelly cock also permits the string to be closed to the natural gas or oil which may on occasion emanate under high pressure from the ground. The Kelly cock must therefore create a tight seal when closed, withstanding tremendous internal pressure of at least 10,000 psi.

Various types of valves have been employed as Kelly cocks, including ball valves. For example, the ball valve manufactured by Hydril Company, Los Angeles, Calif., has a ball rotatably mounted between a fixed upper seat and a spring-loaded lower seat. The ball has a slot which receives a wrench plug for rotating the ball between opened and closed positions. Loading of the valve requires the use of a tool which is inserted from the box end of the casing to compress the ball against the spring below. With the spring compressed, the upper seat is locked in sealing contact with the ball by means of four locking segments which are positioned within a groove in the casing and form an annular shoulder which abuts the upper seat, fixing it with respect to axial movement.

While an improvement over many prior valves, the Hydril valve still suffers from several disadvantages. First, loading the valve requires a tool which must be inserted from the box end into the casing. Secondly, the valve has at least three retaining rings including the locking segments located above the upper seat which present an exposed, uneven surface making them subject to abrasion and corrosion from the drilling fluids.

There is therefore a need for a high pressure Kelly cock valve which can be quickly and easily loaded, and which provides control over the well flow with minimal corrosion and abrasion of parts.

SUMMARY OF THE INVENTION

The disclosed invention which obviates the disadvantages of the prior art is a high pressure ball valve which has particular application as a Kelly cock used in oil well drilling.

The valve comprises a cylindrical casing having an axial bore therethrough for passage of fluids. A ball is rotatably mounted between annular upper and lower seats. The lower seat is supported by an annular shoulder which extends inwardly from the inner wall of the casing. The lower seat comprises three rings bonded to each other in a vertically stacked relation, with the middle ring formed of a compressible elastomer and bonded to upper and lower metal collars. The rings are registered and thus their annuli form a portion of the flow path through the casing.

The ball has a large central bore therethrough whose axis is perpendicular to the ball's rotational axis, so that the fluid path may be opened and closed by rotating the ball. The ball has diametrically opposed open-ended slots that receive a pin and a wrench plug respectively, which are rotatably positioned and fixed with respect to axial movement within diametrically opposed longitudinal apertures in the casing. To rotate the ball to open and close the valve, the plug is turned with a wrench. The plug and its respective slot are machined so that with the ball in its closed position, the ball is free to slide axially with respect to the plug. However, with the ball in its open position, the plug prevents the ball from moving axially.

Prior to loading the valve, the ball is in its closed position so that the ball may float axially between the seats. In order to load the valve under compression to effect a tight seal between the ball and the seats, the ball is turned to its open position in which the plug which engages the slot fixes the ball with respect to axial movement. The valve components are precisely machined so that the distance from the center line of the slots to the shoulder supporting the lower seat with the ring uncompressed is greater than the distance from the rotational axis of the plug to the shoulder. This second distance is fixed. Therefore, rotation of the ball forces the ball axially downward compressing the lower seat between the ball and the shoulder until the aforementioned distances become equal.

With the lower seat under compression the upper seat is prevented from any upward axial movement through the placement of locking segments which are positioned in an annular groove within the casing wall. The ball and upper and lower seats are therefore fixed with respect to axial movement between the lower seat shoulder and the locking segments. Once the valve is loaded in this manner, the ball can be opened or closed without destroying the tight seal which exists between the ball and the upper and lower seats. This valve loading operation can be performed easily and efficiently by simply rotating the ball ninety degrees without the use of any special tools.

When the Kelly cock is in use, the elastomeric ring of the lower seat is exposed to the fluid and is therefore subject to high pressures emanating from either above or below the ball. Such pressures will cause the elastomeric ring to undergo an axial expansion and thereby create a tighter seal between the ball and the upper and lower seat.

A cone is positioned above the insert seal to direct the fluid flow through the valve mechanism. The cone presents a smooth surface which is not subject to abrasion or corrosion by the fluids within the valve. The cone therefore helps protect the valve mechanism parts, including the locking segments.

The head of the wrench which mates with the plug is machined so that the wrench handle extends at a forty-five degree angle from the axis of the casing when the ball is fully opened or closed. This permits the wrench to be rotated through ninety degrees, with maximum leverage when the operator opens or closes the valve without requiring detachment and reinsertion of the wrench.

These and other advantages will be clarified and amplified in the discussion below, with reference to the following drawings in which:

FIG. 3 is a perspective exploded view of the inner valve mechanism with the Kelly cock casing removed;

DETAILED DESCRIPTION OF THE PREFERRED EMBODIMENT

Figure 1:
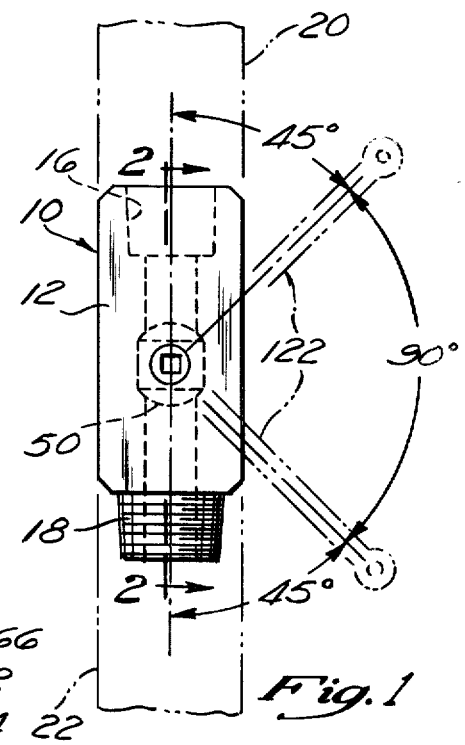
FIG. 1 is a side view of the Kelly cock shown attached to the drill string, and further showing the angle which the wrench traverses when opening and closing the valve.
Figure 2:
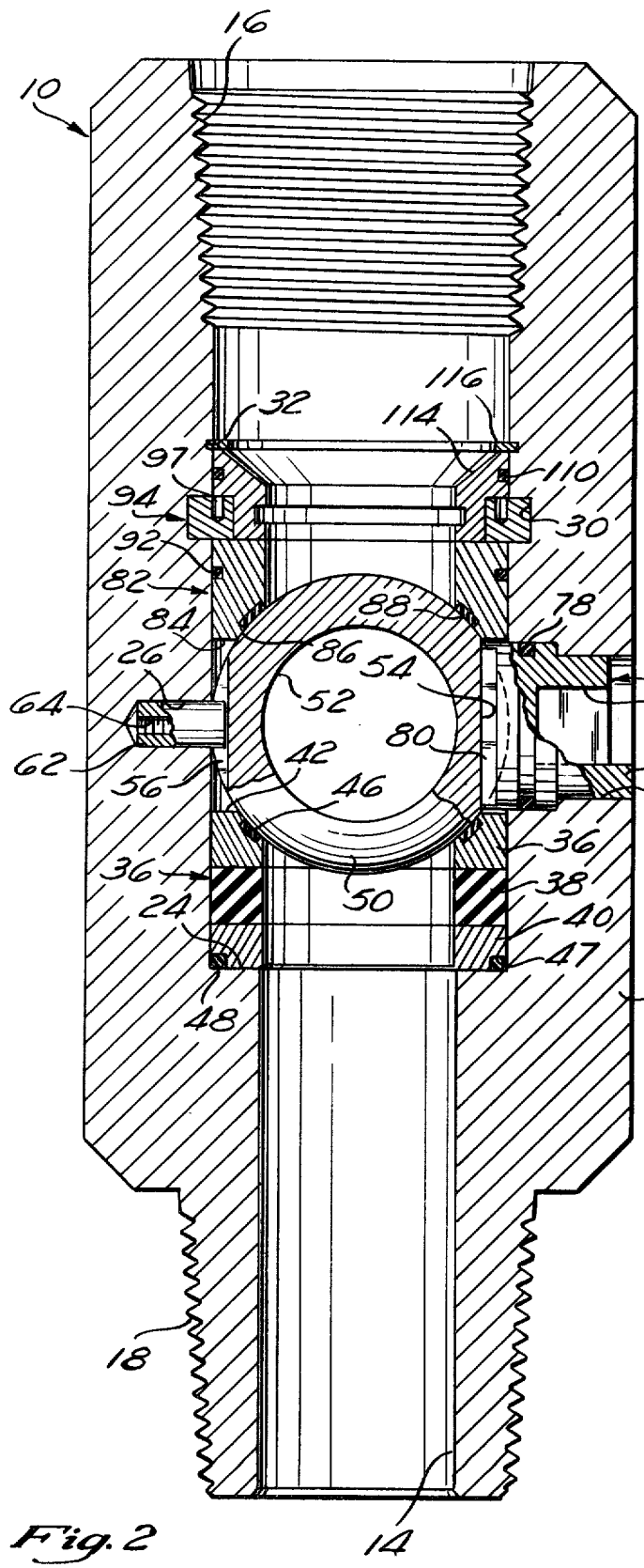
FIG. 2 is a sectional view taken through line 2—2 of FIG. 1.

Referring to FIGS. 1-2, a valve 10 is shown generally having a cylindrical outer body or casing 12 which has a central axial bore 14 therethrough forming a passage for the flow of fluid.

It should be understood that valve 10 has particular application as a Kellycock valve used in oil well drilling rigs. This valve, which can be positioned above or below the Kelly, permits the opening and closing of the drill string to fluid flow. As used herein, the term "fluid" includes both the oil or gas from the well and the drilling fluid, "mud", which is pumped down the drill string. Because such fluids are under great pressure, the Kellycock must be able to withstand pressure of at least about 10,000 psi.

The casing 12 has an interiorly threaded box end 16 and an exteriorly threaded nipple end 18 which mates with upper and lower sections of the drill string 20, 22 in a conventional manner.

Referring to FIG. 2, the casing 12 extends radially inward along the lower third of its length forming an axial shoulder 24. Thus, the axial bore 14 has a wide counter-bore along the upper two-thirds of its length.

About mid-way along its length, the casing 12 has two diametrically opposed apertures 26, 28 which extend radially outward from the axial bore 14 toward the exterior of the casing 12. The axes of the apertures 26, 28 lie along a common line. The aperture 26 extends radially outward about two-thirds the width of the casing 12 and therefore is not in communication with the exterior of the casing. The aperture 28, which is somewhat larger than the aperture 26, extends completely through the casing 12 and is in communication with the exterior.

In an area about one-third the length of the casing from the box end 16, the casing 12 has a large annular groove 30 and a smaller annular groove 32 which is axially spaced above the groove 30. Both grooves 30, 32 extend radially outward from the axial bore 14 toward the exterior of the casing 12, a distance considerably shorter than the length of the aperture 26. Thus, as illustrated in FIG. 2, the counterbored portion of the axial bore 14 below the threads of the box end 16 is of a constant inner diameter except for grooves 30, 32 and apertures 26, 28.

Referring to FIG. 3, the inner mechanism of the valve 10 will now be described. An annular seat 34 is shown comprising an annular collar 36, a middle compressible ring 38 and an annular lower collar 40. The upper collar 36, the ring 38 and the lower collar 40 are in a stacked coaxial orientation having equal outer and inner diameters except in two areas as will be hereinafter described. The ring 38 is bonded to the upper and lower collars 36, 40 through any suitable means. The ring 38 represents a substantial portion of the lower seat 34 radially extending across the entire cross section of the seat 34 between its outer and inner diameters and axially extending about one-third of its height. The lower seat 34 is therefore compressible due to the ring 38.

The collars 36, 40 are formed of a metal such as bronze while the ring 38 is formed of a compressible resilient elastomer. One such elastomer found to be satisfactory is neoprene.

The upper collar 36 has a flat, smooth top 42 which is not as thick as the remainder of the upper collar 36. The collar 36 has an arcuate seating surface 44 which slopes downward and radially inward from the top 42 until the inner diameter of the surface 44 equals the inner diameter of the remainder of the seat 34. An elastomeric annular band 46 covers the lower two-thirds of the beveled surface 44. The band 46 is formed of a compressible resilient material similar to that of the ring 38. As shown in FIG. 2, the lower collar 40 is undercut at its lowermost outer portion to form a recess 47 for an O-ring 48.

Referring again to FIG. 3, a second component of the valve 10 is a ball 50 having a central bore 52 therethrough and diametrically opposed slots 54, 56 (the slot 56 shown only in FIG. 2). The slot 54 is an open ended rectangular recess formed from mutually parallel side walls 51, 53. The slot 54 has a centerline 55 which is equidistant from the sidewalls 51, 53 and is perpendicular to the axis of the bore 52. The slot 56 is similarly formed. The centerlines of the slots 54, 56 lie in a common plane. The slots 54, 56 are essentially identical except that the slot 54 is bordered on either side of the sidewalls 51, 53 by flat, semi-circular areas 58, 60.

The slot 56 receives a cylindrical pin 62 whose outer diameter is sized to fit snugly between the sidewalls of the slot 56 and to fit snugly within the casing aperture 26 (see FIG. 2). The pin 62 has a central bore 64 therethrough which is at least partially threaded.

The slot 54 receives a wrench plug or adapter 66 which is essentially cylindrical having an exterior end 68 and an interior end 70. The exterior end 68 has an essentially square recess 72. One of the walls forming said recess extends exteriorly forming a protrusion 74. The middle section of the plug 66 has a groove 76 for receiving an O-ring 78 (shown in FIG. 2). Interior to the groove 76, the plug 66 widens into the exterior end 70 which is a short cylindrical section having a rectangular protrusion 80 extending interiorly. The protusion 80 is sized to fit snugly between the sidewalls 51, 53 of the slot 54. The adapter 66 itself is sized to fit snugly within the aperture 28 which is counter-bored to conform to the wide interior end 70 of the adapter 66 (see FIG. 2).

Referring to FIGS. 2-3, another component of the valve 10 is an annular upper seat 82. As shown in FIG. 2 the upper seat 82 has a flat, smooth annular bottom 84 which is not as thick as the remainder of the seat 82. The seat 82 has an arcuate seating surface 86 which slopes upward and radially inward from the bottom 84 until the inner diameter of the surface 86 equals the inner diameter of the upper portion of the seat 82. The radius of the seating surface 86, as well as that of the lower seating surface 44 is the same as that of the ball 50. An elastomeric band 88 covers the upper two-thirds of the beveled surface 86. The band 88 is formed of a compressible resilient material similar to that of the band 46 used with the lower seat 34. It will now be understood that structurally the seat 82 is very similar to the upper collar 36 of the lower seat 34 except that the upper seat 82 is about twice as high as the collar 36. The upper seat 82 also has an annular groove 90 in its exterior surface for receiving an O-ring 92.

Referring to FIG. 3, another component of the valve 10 is the annular locking ring 94 which is formed of four separate locking segments referenced generally as 96. The segments 96 are discrete and unattached, each end of the segments 96 being complementarily machined to fit flush with an adjacent segment to form the ring 94. Each segment 94 also has an axial aperture 97 therethrough.

Another component of the valve 10 is an annular cone 98. Although the cone 98 is of one-piece construction it may be conceptualized as having an upper portion 100 and a lower portion 102 which is undercut with respect to the upper portion 100 forming an annular recess 104 so that the outer diameter of the lower portion 102 is less than that of the upper portion 100. The lower portion 102 has a smaller inner annular groove 106.

The upper portion 100 has a small annular outer groove 108 sized to receive an O-ring 110. (See FIG. 2). The upper portion 100 has a thin flat annular top surface 112 which extends into a beveled surface 114 which slopes downward and radially inward until the inner diameter of the upper portion 100 is equal to the inner diameter of the lower portion 102. The cone 98 therefore has a funneled smooth opening.

The final valve component is a conventional snap ring 116 which is a thin metal piece that traverses about 320° of a circle ending in widened ends 118 having small apertures 120 therethrough. The ring 116 therefore resembles a thin, circular horseshoe.

Having described the components of the valve 10, their functional interrelationship in the compression loading and operation of the Kellycock will be described with reference to FIGS. 2 and 4. In order to begin assembly of the valve 10, the lower seat 34 is positioned within the casing 12 by inserting it through the box end 16 axially downward until the lower seat 34 seats flush against and is supported by the shoulder 24. The outer diameter of the lower seat is sized to fit snugly within the wide, counter-bored section of the axial bore 14.

The pin 62 and the wrench plug 66 are then inserted into their respective apertures 26, 28. The O-ring 78 of the wrench plug 66 provides a good seal between the plug 66 and the aperture 28. The plug should be rotated so that the rectangular protrusion 80 is in an upright, vertical position as shown in FIG. 2 or 4. The purpose of the threaded bore 64 in the pin 62 is to permit an operator to retrieve the pin 62 if it would become stuck within the aperture 26 with a tool that would be threaded into the bore 64.

The ball 50 is then inserted down the axial bore 14 in the closed position so that the slots 54, 56 receive the pin 62 and the protrusion 80 of the adapter 66, permitting the ball to slide axially downward against the funneled opening of the lower seat 34 formed by the beveled surface 44 and its overlying resilient band 46. The band 46 forms a good sealing surface between the ball 50 and the lower seat 34. It should now be understood that the adapter plug 66 could be inserted after the ball 50 is in place.

With the ball 50 in its closed position, the ball 50 is free to float axially upward due to the fact that the adapter 66 and the pin 62 slidably engage their respective slots 54, 56 which are open ended.

The pin 62 and adapter 66 are substantially fixed with respect to axial movement because they fit closely within their respective apertures 26, 28.

Figure 4:
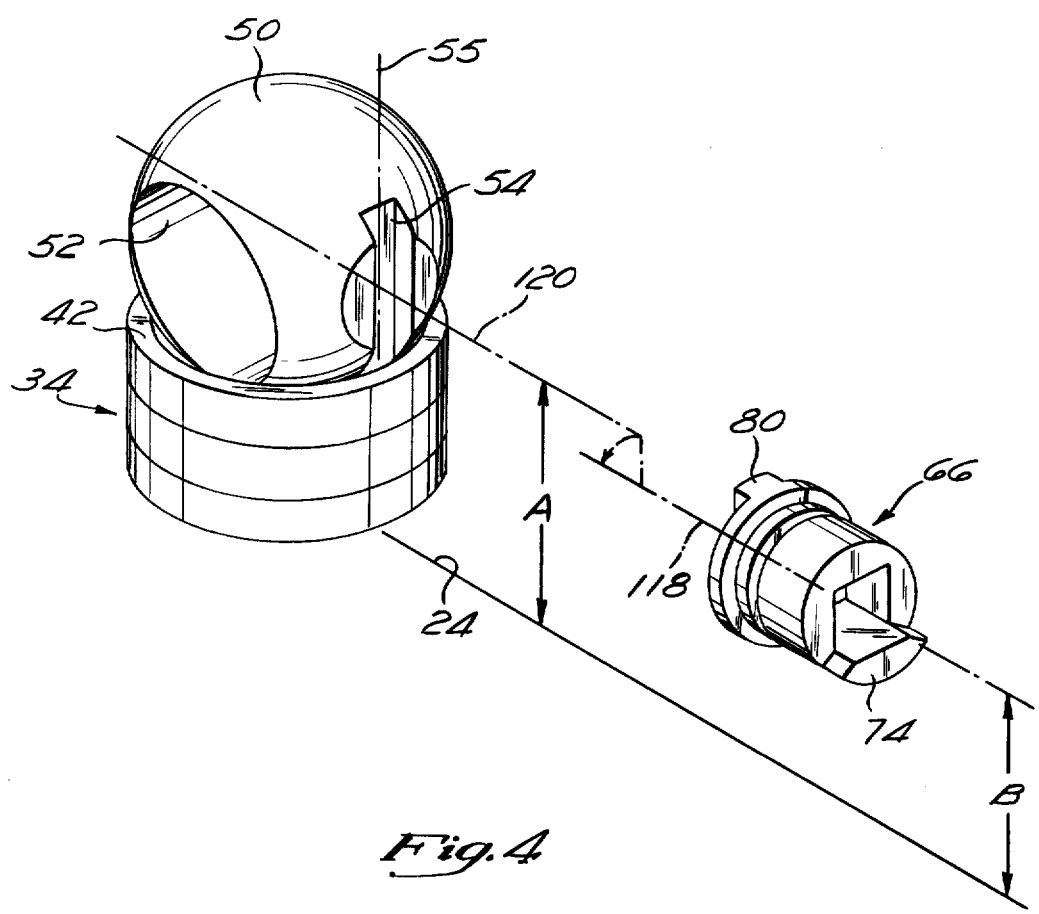
FIG. 4 is a perspective view of the ball seated against its lower seat with the casing removed and with a wrench plug positioned for engagement with the ball.

Referring to FIG. 4, the adapter 66 is shown having a rotational axis 118. It should be understood that the rotational axis of the pin (not shown) coincides with the axis 118. The distance, referenced "B" in FIG. 4, between the rotational axis 118 and the shoulder 24 is fixed irrespective of the position of the ball 50. The ball 50 may be conceptualized as having a physical axis 120 which extends through the center of the ball 50 and extends through and is perpendicular to the centerline 55 of the slot 54. If the ball 50 moves axially, the physical axis 120 will also move. At this stage of assembly when the ball 50 is in its closed position, the physical axis 120 does not coincide with the rotational axis 118 of the plug 66. The reason for this lack of coincidence is due to the fact that the distance, referenced "A" in FIG. 4, from the physical axis 120 to the shoulder 24 when the lower seat 34 is not compressed is greater than the distance "B" from the rotational axis 118 of the adapter 66 to the shoulder 24. Since the ball 50 in its closed position is free to float axially upward, the physical axis 120 will be displaced upward from the rotational axis 118 of the plug 66.

In order to load the ball valve 10 under compression, the plug 66 is rotated 90° (illustrated by the arrow in FIG. 4) until the ball 50 is in its fully opened position. In this position the ball 50 can no longer move axially because the slot 54 is engaged with the plug 66 which is fixed axially. It should be understood that when the ball is in its open position, the centerline 55 of the slot 54 will be parallel to the shoulder 24. As stated above, the slots 54, 56, the ball 50 and the lower seat 34 are designed so that the distance A from the physical axis 120 to the shoulder 24 with the lower seat 34 uncompressed is greater than the fixed distance B of the plug's rotational axis 118 to the shoulder 24. Thus, the rotation cams the ball 50 downward against the lower seat 34 which is thereby compressed against the shoulder 24 until the distance A equals the distance B. In other words, the lower seat 34 will be compressed to an extent sufficient to allow the rotational axis 118 of the adapter 66 to coincide with the physical axis 120 of the ball 50. It will now be understood that the slot 54 and the pin 62 prevent the ball 50 from skewing as the ball 50 is cammed downward against the lower seat 34. The compression of the lower seat 34 is made possible by the elastomeric ring 38. Thus, a tight seal is achieved between the lower seat 34 and the ball 50.

Referring to FIG. 2, with the lower seat 34 under compression, the upper seat 82 is lowered through the box end 16 until the funnel opening of the upper seat 82 is flush with the ball 50.

The elastomeric band 88 creates a good sealing surface between the ball 50 and the upper seat 82. Moreover, the O-ring 92 creates a good seal between the upper seat 82 and the axial bore 14. It should be understood that the upper seat 82 may be positioned against the ball 50 prior to compression loading the lower seat 34.

With the lower seat 34 under compression the upper seat 82 extends upward to a point just below the groove 30 within the casing 12. The locking segments 96 are then placed within the groove 30 to form the annular ring 94. The apertures 97 permit the segments 96 to be lowered and retrieved with a tool which would be inserted into the apertures. The locking ring 94 holds the upper insert 82 in position and prevents it from any upward axial movement. The lower seat 34 will therefore remain in a continually compressed state since any axial downward movement is prevented by the shoulder 24 and any upward axial movement is prevented by the locking ring 94.

In this way, the valve is in a fully loaded state so that a tight seal is achieved between the ball 50 and the upper and lower seats 34, 82. It should now be understood that with the upper seat 82 locked in place, the ball 50 may be rotated to its closed position and the lower seat 34 will remain under compression so that a tight seal is maintained between the ball 50 and the lower and upper seats 34, 82. Thus, the locking ring 94 prevents the ball 50 from being able to float axially upward when the ball is in its closed position. In other words, the physical axis 120 of the ball 50 will remain in coincidence with the rotational axis 118 of the plug 66 irrespective of whether the valve is open or closed.

In short, full compression loading is achieved simply and effectively by rotating the ball 90° and placing the lower seat 34 under compression. No special tools are required. Another important aspect of the elastomeric ring 38 is that it is exposed to the flow path and is therefore subject to the tremendous pressure exerted by the drilling fluids, from above or below. When pressure is exerted radially outward against the inner wall of the ring 38, the ring 38 will tend to expand axially creating an even tighter seal between the ball 50 and the seats 34, 82.

The cone 98 is then inserted through the box end 16 with its lower portion 102 extending through the annulus of the locking ring 94. The recess 104 of the lower portion 102 is therefore sized to receive the locking ring 94. The O-ring 110 forms a tight seal between the cone 98 and the axial bore 14 and the groove 106 permits the cone to be retrieved by an operator with the use of a tool which is inserted into the groove 106.

It should be understood that the inner diameters of the lower seat 34, the axial bore 52 of the ball 50, the upper seat 82, and the lower portion 102 of the cone 98 are essentially equal forming a flow path which is smaller than the inner diameter of the counter-bored section of the axial bore 14. The cone 98 therefore serves to gradually narrow the flow path until it is equal to the inner diameter of the upper and lower seats 34, 82 and the bore 52 of the ball 50. It should be remembered that the drilling mud flows downward through the axial bore 14 with tremendous pressure which can easily abrade and corrode the parts of a valve mechanism. The smooth, beveled surface 112 of the cone 98 prevents abrasion and corrosion by gradually directing the flow of the mud from the wide portion of the axial bore 14 into the narrower channel formed by the seats 34, 82 and the ball 50. The cone 98 also protects and covers the locking ring 94 preventing it from being exposed and abraded by the drilling fluid.

The cone 98 is held in place by the snap ring 116 which is inserted into the groove 32 in the casing 12 in a conventional manner.

Figure 5:
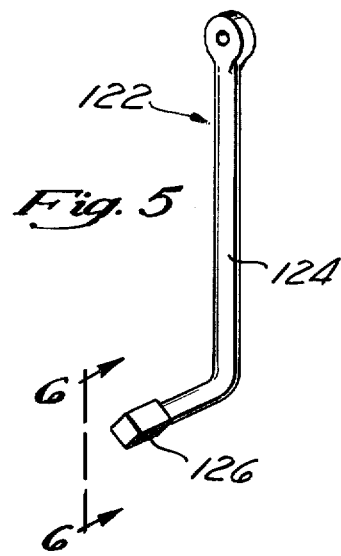
FIG. 5 is a perspective view of the wrench used to turn the plug that opens and closes the valve.
Figure 6:
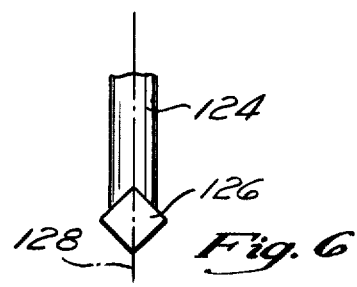
FIG. 6 is an end view of the wrench head taken through line 5—5 of FIG. 4.

As described above, the ball 50 is opened and closed through rotation of the plug 66. The plug 66 is conventionally rotated manually with a wrench that is inserted into the plug. Applicants have discovered a novel wrench which permits a much easier rotation operation. Referring to FIGS. 5 and 6, a wrench 122 is shown having an essentially elongate handle 122 which extends into a square head 126. As best shown in FIG. 6, the head 126 is oriented with respect to the handle 124 so that a diagonal 128 of the square head 126 is coaxial with the axis of the handle 124. The head 126 is shaped and sized to fit within the square recess 72 of the plug 66.

As shown in FIG. 1 when the wrench 122 is inserted into the plug 66 with the ball in either its fully open or fully closed position, the wrench handle 122 will extend at about a 45° angle from the axis of the casing 12. The wrench 122 can then be rotated a full 90° to fully rotate the ball 50 with substantial leverage without requiring the operator to detach the wrench 122 from the plug 66 and reinsert it to complete the 90° turn. With prior wrenches the head was oriented with respect to the wrench handle so that the wrench would extend at a 90° angle from the axis of the casing with the ball in a fully open or closed position. The operator could therefore only turn the wrench about 45° before so much leverage was lost that the wrench had to be detached and reinserted into the adapter. This loss of leverage is particularly important when rotation of the ball is achieved by rotating the wrench with a cat line rather than through a direct manual operation.

What is claimed is:

1. A method for compression loading and operating a ball valve comprising:
   providing a casing having a flow passage therethrough;
   providing a compressible annular first valve seat;
   providing a means for supporting said first valve seat within said casing
   providing a ball rotatably supported by said first valve seat; and
   rotating said ball about a first axis of said ball to compress said first valve seat against said supporting means and to thereby effect a tight seal between said ball and said first valve seat; and
   rotating said ball about said first axis of said ball to open and close said valve.

2. The method of claim 1, further comprising:
   providing an annular second valve seat on the side of said ball opposite said first valve seat; and
   holding said second valve seat fixed within said casing.

3. A method for compression loading and operating a ball valve comprising:
   providing a casing having a flow passage axially therethrough;
   providing compressible annular first valve seat;
   providing a means for supporting said first valve seat within said casing;
   providing a ball rotatably supported by said first valve seat; and
   rotating said ball to displace said ball along the axis of said passage and to thereby compress said first valve seat against said supporting means and to thereby effect a tight seal between said ball and said first valve seat.

4. A method for compression loading a ball valve comprising:
   providing a casing having an axial bore to provide a flow passage therethrough;
   providing a compressible annular first seat;
   providing means for supporting said first seat within the casing;

providing a ball rotatably supported by said first seat, said ball having a slot having a center line; and providing means for rotating said ball, said rotating means having a rotational axis which is fixed with respect to axial movement, and engaging said slot in a manner to permit said ball to move axially within said passage when said ball is in a first position and preventing said ball from moving axially when said ball is in a second position, said ball having a physical axis which extends through the center of said ball and extends through and is perpendicular to the center line of said slot, said physical axis and said rotational axis being axially spaced when said ball is in said first position because the axial distance from the physical axis to the first seat supporting means when the first seat is uncompressed is greater than the axial distance from the rotational axis to the first seat supporting means; and rotating said ball into said second position with said rotating means to cam the ball downward compressing said first seat against said supporting means until said rotational axis coincides with said physical axis.

5. The method of claim 4 further comprising:

providing an annular second seat rotatably supported by said ball; and holding said second seat fixed with respect to upward axial movement against said ball with said first seat in a compressed state to create a tight seal between said second seat and said ball.

6. A method for compression loading a ball valve comprising:

providing a casing having an axial bore to provide a flow passage therethrough;

providing a compressible first seat;

providing means for supporting said first seat within the casing;

providing a ball rotatably supported by said first seat, said ball having first and second diametrically opposed slots having center lines in a common plane;

providing means for rotating said rotating ball, said means engaging said first slot;

providing means for engaging said second slot, said rotating means and said engaging means being fixed with respect to axial movement and lying along a common rotational axis, said ball being rotatably between first and second positions, the orientation of said slots with respect to said engaging and rotating means when said ball is in said first position permitting axial movement of the ball within the passage and prohibiting axial movement of the ball within the passage when the ball is in said second position, said ball having a physical axis extending through the center of said ball and extending through and perpendicular to said center lines, said valve having a first distance from said first seat supporting means to said rotational axis less than a second distance from said physical axis to said first seat supporting means when the first seat is uncompressed and when the ball is in said first position; and rotating said ball into said second position to compress said first seat until said physical axis coincides with said rotational axis and said first distance is equal to said second distance.

7. The method of claim 6 further comprising:

providing an annular second seat supported within said housing; and holding said second seat fixed with respect to upward axial movement against said ball with said first seat in a compressed state to create a tight seal between said second seat and said ball.

8. A high pressure ball valve comprising:

a casing having a flow passage therethrough;

a ball rotatably mounted within said casing, said ball having a bore therethrough perpendicular to the ball's rotational axis to permit opening and closing said flow passage to fluid flow by rotating the ball, a first annular valve seat mounted within said casing and forming a portion of said flow passage, said first annular valve seat positioned on one side of said ball;

a second annular valve seat mounted within said casing and forming a portion of said flow passage, said second annular valve seat positioned on the other side of said ball, said second annular valve seat further comprising:

an elastomeric ring having first and second axially opposed surfaces;

a first annular collar joined to said first surface of said ring, said first annular collar abutting the other side of said ball; and a second annular collar, joined to said second surface of said ring;

said ring being coaxial with said first and second collars, the annuli of said ring and collars forming a portion of said flow passage, said first and second annular collars being relatively axially moveable when said second seat has been loaded through the pre-compression of said ring to create a tight seal between said ball and said upper and lower seats, said ring having an annular inner wall in communication with the fluid flow to permit said ring when exposed to fluid pressure to undergo axial expansion to relatively axially move said first and second collars and to thereby create a more secure seal between said ball and said upper and lower seats.

9. A high pressure ball valve comprising:

a casing having a flow passage therethrough;

first and second annular seats within said casing, each having a rigid face;

a ball rotatably mounted and sealed between said rigid faces of said first and second seats within said casing, said ball having a bore therethrough perpendicular to the ball's rotational axis to permit opening and closing said passage to fluid flow by rotating said ball;

means for supporting one side of said first seat within said casing, while the other side of said first seat rests against said ball; said other side comprising said rigid face;

said first seat being compressible to permit said first seat to be loaded through compression to create a tight seal between said ball and said first and second seats, said other side of said first seat being axially supported during said pre-compression, only by said ball.

10. The valve of claim 9 wherein said first seat has a compressible portion which is in communication with the fluid flow to permit axial expansion to move said one side of said first seat away from said other side of said first seat and to thereby create a more secure seal between said ball and said first and second seats.

11. The valve of claim 9 further comprising a cone positioned above said second seat for directing fluid through said passage.

12. A ball valve assembly, comprising:
a casing having an axial bore therethrough which forms a passage for fluid flow;
a first compressible annular seat positioned within said casing;
means for supporting said first seat within said casing;
a ball supported by said first seat, said ball being rotatable between a closed position and an open position to control fluid flow through said passage, said ball having a slot therein, said slot being characterized by a center line; and
means for rotating said ball, said rotating means having a rotational axis fixed with respect to axial movement of said ball, said rotating means engaging said slot to permit axial movement of said ball within said passage when said ball is in one of said closed and open positions and to retain said ball against axial movement when said ball is in the other of said closed and open positions, said ball having a physical axis extending through the center thereof and perpendicularly intersecting the center line of said slot, said physical axis and said rotational axis being axially spaced when said ball is in one of said first positions because the axial distance from said physical axis to said first seat supporting means when said first seat is uncompressed is greater than the axial distance from the rotational axis to said first seat supporting means, said ball being rotatable into other of said positions by said rotating means to cam said ball against said first seat to compress said first seat against said first seat supporting means to form a sealing force between said ball and said first seat.

13. Apparatus according to claim 12 further comprising:
an annular second seat supported within said casing; and
means for retaining said second seat against axial movement relative to said ball while said first seat is in a compressed state to create a seal between said second seat and said ball.

14. A ball valve assembly, comprising:
a casing having an axial bore therethrough to form a passage for fluid flow;
a compressible first seat positioned within said bore;
means for supporting said first seat within said casing;
a ball supported by said first seat, said ball being rotatable between a closed position and an open position to control fluid flow through said axial bore, said ball having first and second diametrically opposed slots therein having center lines in a common plane;
means inserted in said first slot for rotating said ball; and
means for engaging said second slot, said rotating means and said engaging means being fixed with respect to axial movement of said ball within said axial bore and having a common rotational axis, the orientation of said first and second slots with respect to said engaging and rotating means when said ball is in one of said closed and open positions permitting axial movement of said ball within said passage and retaining said ball against axial movement within said passage when said ball is in the other of said closed and open positions, said ball having a physical axis extending through the center thereof and perpendicularly intersecting said center lines of said first and second slots, respectively, the distance from said first seat supporting means to said rotational axis being less than the distance from said first seat supporting means to said physical axis when said first seat is uncompressed and when said ball is in said one of said positions, said rotating means rotating said ball from said one of said positions to said other of said positions to compress said first seat to form a seal between said ball and said first seat.

15. A ball valve assembly, comprising:
a casing having an axial bore for permitting fluid flow therethrough;
a compressible first seat positioned within said casing;
means for supporting said first seat within said casing;
a second seat supported within said casing;
means inserted in said first slot for rotating said ball;
means for engaging said second slot, said rotating means and said engaging means being fixed with respect to axial movement of said ball within said axial bore, the orientation of said first and second slots with respect to said engaging means and said rotating means permitting axial movement of said ball within said axial bore when said ball is in one of said closed and open positions and retaining said ball against axial movement within said axial bore when said ball is in the other of said closed and open positions, said ball and said rotating means having axes of rotation which are spaced apart when said ball is in the closed position, said first seat being compressible such that rotation of said rotating means to move said ball from said one of said positions to said other of said positions cams said ball against said first seat to compress said first seat against said first seat supporting means to form a seal.

* * * * *